Aug. 30, 1932.    M. L. CONDON    1,874,029
METHOD AND MEANS FOR ANCHORING TRANSPLANTED TREES
Filed Oct. 1, 1931    2 Sheets-Sheet 1
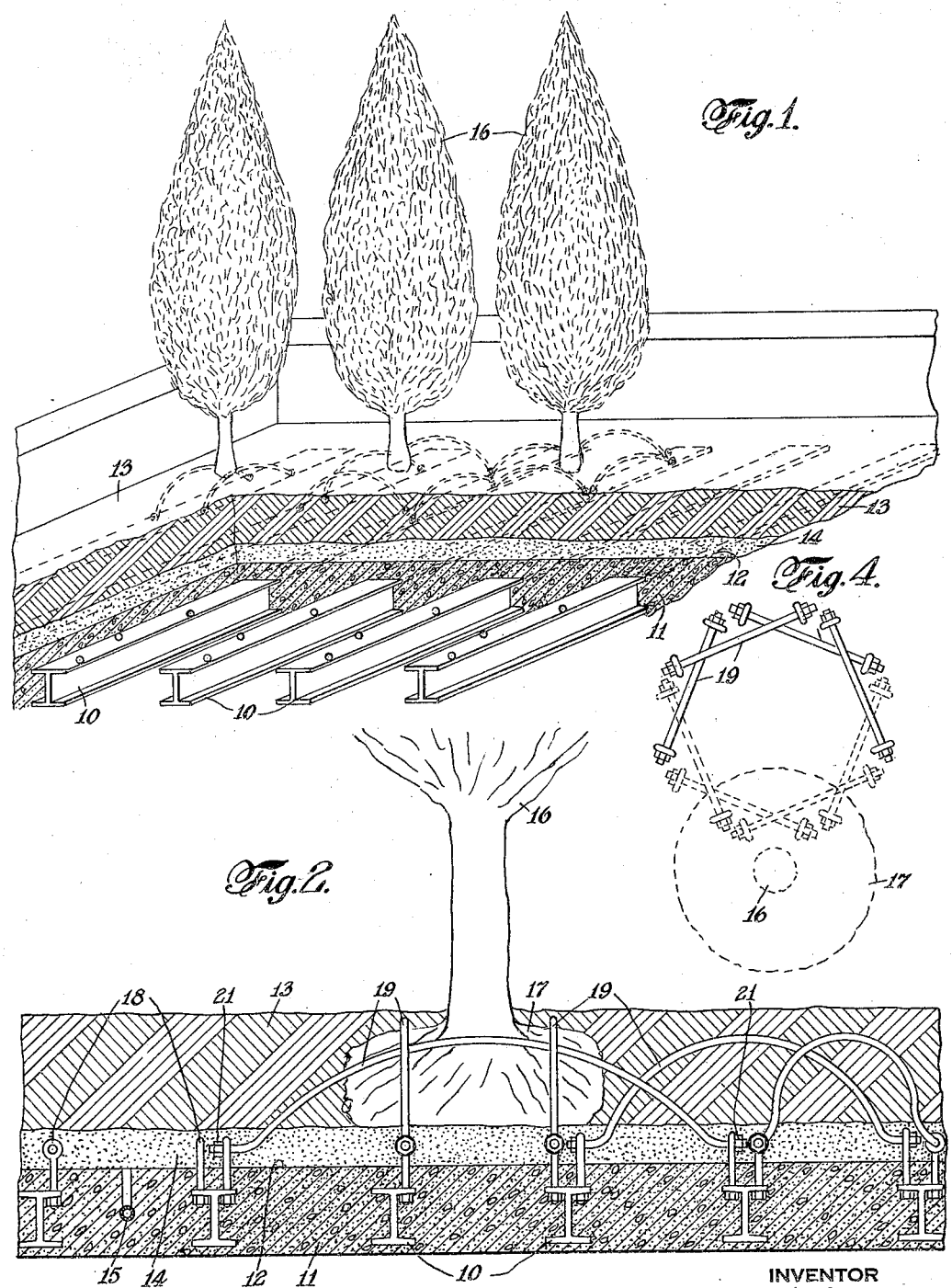
INVENTOR
MAURICE L. CONDON
BY
ATTORNEY Aug. 30, 1932.  M. L. CONDON  1,874,029
METHOD AND MEANS FOR ANCHORING TRANSPLANTED TREES
Filed Oct. 1, 1931  2 Sheets-Sheet 2

INVENTOR
MAURICE L. CONDON
BY
ATTORNEY

Patented Aug. 30, 1932

1,874,029

UNITED STATES PATENT OFFICE

MAURICE L. CONDON, OF LAKE MAHOPAC, NEW YORK

METHOD AND MEANS FOR ANCHORING TRANSPLANTED TREES

Application filed October 1, 1931. Serial No. 566,269.

The invention relates to a method and means for securely anchoring trees, especially of substantial size as well as large shrubs and the like and which have been transplanted to a location where but a shallow soil condition obtains, in that the soil is artificially supported.

It has for an object the provision of means for securely holding the root system of such transplanted trees permanently to the support for the soil.

A further object of the invention resides in the novel method of associating the root system with respect to the holding means thereof.

Another object of the invention resides in the temporary support of the tree during the period that the root system is extending itself to advance through the holding means and become intertwined therewith.

In carrying out the invention, the tree or the like to be transplanted, which is preferably root-pruned, is set in the desired location and within a series of surrounding upstanding loop or clamp members which are securely attached to the flooring or other support for the soil which is caused to cover the roots after the tree is set. These loops may be arranged to engage directly the root system, or the tree may be temporarily guyed until the root system eventually extends through the loops and intertwines therewith.

The nature of the invention, however, will best be understood when described in connection with the accompanying drawings, in which:

Fig. 1 is a fragmentary view in perspective, and with parts broken away, of a corner of a roof to which a number of trees have been transplanted.

Fig. 2 is a vertical section, on an enlarged scale, through a portion of the roof and a tree planted thereon in the soil supported by said roof.

Fig. 4 is a fragmentary view illustrating a different arrangement of the loops for holding a tree in position.

Figure 3:
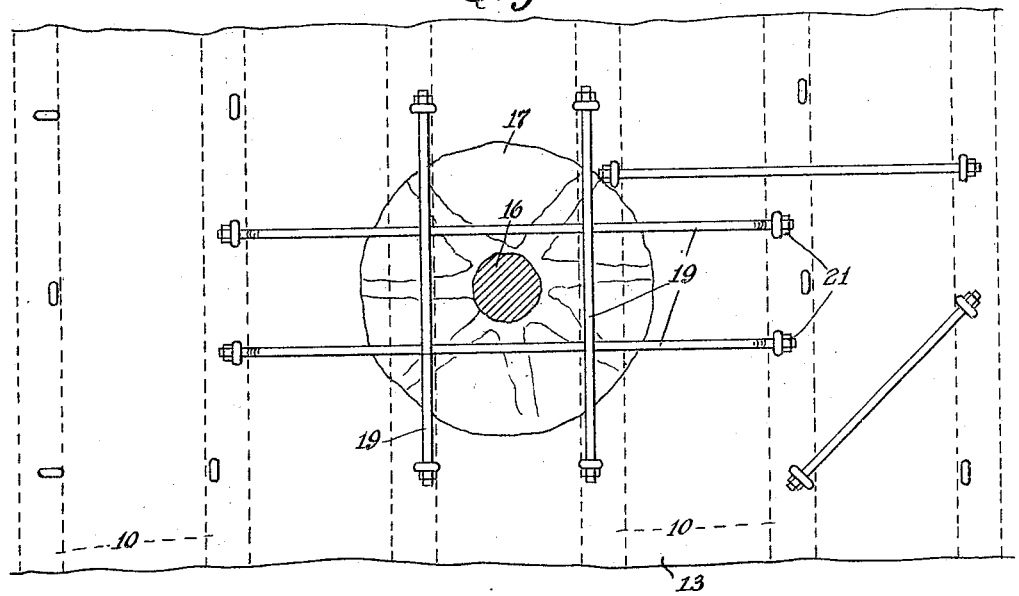
Fig. 3 is a horizontal section through the trunk of a tree with its root system anchored in the novel manner.

Referring to the drawings, more particularly Figs. 1 to 3 thereof, 10 designates a plurality of supporting beams or girders as of a roof, bridge or the like and imbedded in a suitable flooring material 11 such as concrete affording a floor or support 12 for a layer of soil 13. It is preferred to include an intermediate stratum or layer 14 of cinders or other light porous material for drainage purposes, and drain outlets 15 may be provided in the concrete to communicate with the bed of cinders. It will be understood that the layer of soil 13 is relatively shallow and would not of itself afford a sufficient hold for a tree of any appreciable size, as the roots thereof cannot penetrate deeply. It will also be understood that trees planted in locations, as upon roofs and the like, are exposed to wind of high velocity and must be securely anchored.

Provision is, therefore, made for positively holding a tree, through its root system, independently of the soil hold thereon. For example, trees 16 having a root system 17, preferably root-pruned as indicated, are transplanted with balls of earth about said roots, being bagged in burlap or the like in the usual manner. Prior to the transplanting of the tree, there is arranged to project through the cinder stratum suitable securing means as eye bolts 18 for a plurality of upstanding loop members 19 which may be of metal rod, cable or other suitable material and adapted for entirely surrounding the said root system.

The loops are designed to remain entirely below the soil level and are arranged to be attached in any convenient manner to some fixed support as, for example the beams 10 through the eye bolts 18 which extend upwardly from the upper flanges of the beams. These bolts are designed to receive through their eyes the ends of the respective loops, being held by suitable nuts 21 fitting over the projecting end. By providing these eye bolts at different points along the length of a beam, loops may be variously located and in different conformations to securely hold down a root system to the fixed support or floor. While the depth of soil may not be sufficient to alone hold a tree after planting, yet by mechanically holding the same as hereinbefore described, it is securely fixed in the desired location and cannot be uprooted.

In introducing a tree to its location, a number of the loops may be removed, as indicated by the loops shown in dotted lines, Fig. 4 of the drawings, so that the root ball may be passed therethrough into the opening provided and with the fixed loops embracing a portion of the said root system. The remaining loops are then replaced to further embrace the root system which is then entirely enclosed and surrounded by the loops.

Figure 5:
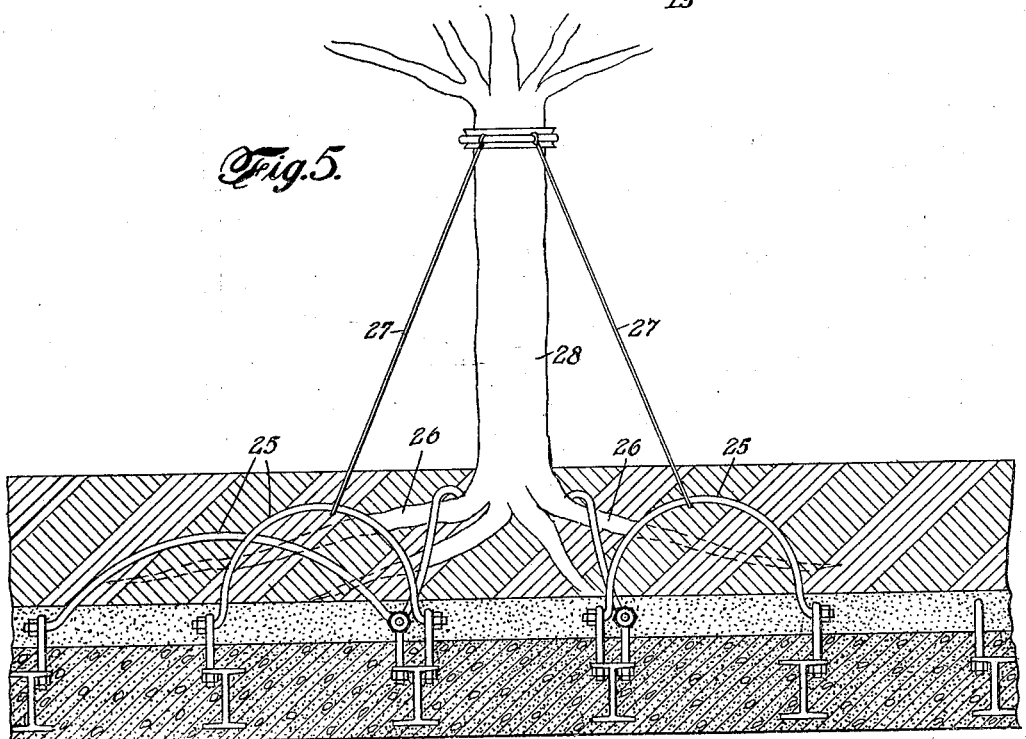
Fig. 5 is a fragmentary view in elevation, illustrating a modification in the method of anchoring a tree.

In some instances, and especially where the tree is not root-pruned, the upstanding loop elements 25, Fig. 5, may be disposed beyond the radius of the roots 26 or substantially at the end thereof but not initially entirely embracing the same, the said roots being intended eventually to extend beneath the loop elements and to intertwine with the loops, as indicated by the portions of the roots shown in dotted lines. The tree is then temporarily to be guyed as by the guy wires 27 having one end attached to the trunk 28 of the tree and the other to some fixed support, for example, the loop elements 25 themselves. As soon as the roots have been sufficiently extended to be firmly retained by the different loops associated therewith, the guy wires 27, of course, may be removed.

I claim:

1. In a system for anchoring transplanted trees within artificially supported soil: a support for the soil, and secured upstanding loop members for engaging with the roots of a tree set in such soil.

2. In a system for anchoring transplanted trees within artificially supported soil: a support for the soil, and upstanding loop members secured below the eventual soil level for engaging with the roots of a tree set in such soil.

3. In a system for anchoring transplanted trees within artificially supported soil: a support for the soil, and upstanding loop members secured to the support below the eventual soil level for engaging with the roots of a tree to be set in such soil.

4. In a system for anchoring transplanted trees within artificially supported soil: a support for the soil, upstanding loop members secured below the eventual soil level for engaging with the roots of a tree to be set in such soil, and guy wires having one end attached to the tree and the other to the loops.

5. In a system for anchoring transplanted trees within artificially supported soil: roof beams and flooring material constituting a floor for supporting soil, and upstanding means secured to the beams in surrounding relationship to a tree to be set in the soil for engagement with the root system thereof.

6. In a system for anchoring transplanted trees within artificially supported soil: roof beams and flooring material constituting a floor for supporting soil, securing eye bolts attached to the beams, and upstanding loops secured to the eyes of said bolts in surrounding relation to a tree to be set in the soil for engagement with the root system thereof.

7. In a system for anchoring transplanted trees within artificially supported soil: roof beams and flooring material constituting a floor for supporting soil and an intermediate stratum of cinders, the floor being provided with a drainage opening in communication with the cinder stratum, and upstanding means secured to the beams in surrounding relationship to a tree to be set in the soil for engagement with the root system thereof.

8. The method of anchoring transplanted trees in artificially supported soil, which comprises positioning them in the desired location, and retaining them upright by causing the roots thereof to pass through and to intertwine with elements of the support.

9. The method of anchoring transplanted trees in artificially supported soil, which comprises positioning them in the desired location, retaining them upright by causing the roots thereof to pass through and to intertwine with elements of the support, and temporarily guying them to the support until the roots have become sufficiently intertwined with the support elements.

In testimony whereof I affix my signature.

MAURICE L. CONDON.